Feb. 23, 1960 W. V. GOODHUE ET AL 2,926,014
SHEET SUPPLYING APPARATUS FOR COIL WINDING MACHINES
Filed Feb. 17, 1956 4 Sheets-Sheet 1

INVENTOR.
WILLIAM V. GOODHUE
CHARLES G. REYNOLDS
BY ROBERT S. WHITE

*Albert P. Davis*

ATTORNEY

Feb. 23, 1960   W. V. GOODHUE ET AL   2,926,014
SHEET SUPPLYING APPARATUS FOR COIL WINDING MACHINES
Filed Feb. 17, 1956   4 Sheets-Sheet 2

INVENTOR.
WILLIAM V. GOODHUE
CHARLES G. REYNOLDS
BY ROBERT S. WHITE

*Albert P. Davis*

ATTORNEY

Feb. 23, 1960  W. V. GOODHUE ET AL  2,926,014
SHEET SUPPLYING APPARATUS FOR COIL WINDING MACHINES
Filed Feb. 17, 1956  4 Sheets-Sheet 3

INVENTOR.
WILLIAM V. GOODHUE
CHARLES G. REYNOLDS
BY ROBERT S. WHITE

ATTORNEY

INVENTOR.
WILLIAM V. GOODHUE
BY CHARLES G. REYNOLDS
ROBERT S. WHITE

ATTORNEY

United States Patent Office 2,926,014
Patented Feb. 23, 1960

2,926,014

SHEET SUPPLYING APPARATUS FOR COIL WINDING MACHINES

William V. Goodhue, North Kingston, Charles G. Reynolds, Cranston, and Robert S. White, Warwick, R.I., assignors to Leesona Corporation, a corporation of Massachusetts Application February 17, 1956, Serial No. 566,225

7 Claims. (Cl. 271—57)

The present invention relates to an improvement in machines for winding electrical coils and more particularly relates to such a machine adapted to periodically insert a sheet of insulating material into the winding coil and having means to stop said machine in the event it fails to so insert a sheet of insulating material.

Unted States Patent No. 2,688,450 issued September 7, 1954 to Charles C. Bell discloses and claims a machine for producing electrical coils. The machine disclosed in said patent is adapted to wind a plurality of coils side by side on an elongated core and to insert a sheet of insulating material between each layer of wire wound in each coil. The winding machine is provided with a mechanism that automatically measures and cuts a sheet of paper, or other insulating material, and at the end of each layer of wire wound on the coil automatically inserts the measured and cut sheet into the coil. The coil winding machine disclosed in said patent is fully automatic, that is to say, that once it has been threaded up and the winding cycle started, the machine continues to operate until the predetermined number of turns of wire have been wound, at which time it shuts itself off. Inasmuch as the winding machine is automatic and requires attention only periodically to remove wound coils and to start the winding of the new coil, an operator can attend a plurality of these machines and great savings and labor are thus realized.

The insulating material inserted by the winding machine disclosed in said Patent No. 2,688,450 is normally extremely thin and difficult to handle and occasionally it becomes wrinkled or torn, or otherwise affected, so that the paper measuring and delivering part of the mechanism can not function properly and resulting in the omission of one or more layers of insulation. When this occurs a whole stick of coils can be wound without the operator being aware of the malfunction, resulting in the loss of considerable amount of wire and production from the machine.

One object of the present invention is to provide a detecting mechanism and cooperating electrical circuit for use with a winding machine adapted to automatically insert a layer of sheet insulation at predetermined intervals in a winding coil which will stop said winding machine in the event it fails to so insert said insulation.

Another object of the present invention is to provide a mechanism and cooperating electrical circuit for use with a winding machine adapted to insert a sheet of insulating material at predetermined intervals in a winding coil which will stop said winding machine in the event a sheet of insulation is not available for insertion in the winding coil.

Another object of the present invention is to provide a mechanism and cooperating electrical circuit for use with a winding machine adapted to insert a sheet of insulating material at predetermined intervals in a winding coil which will stop said winding machine in the event a sheet of insulation is not available for insertion in the winding coil and will also stop the machine in the event it fails to so insert a sheet of insulating material in the winding coil.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
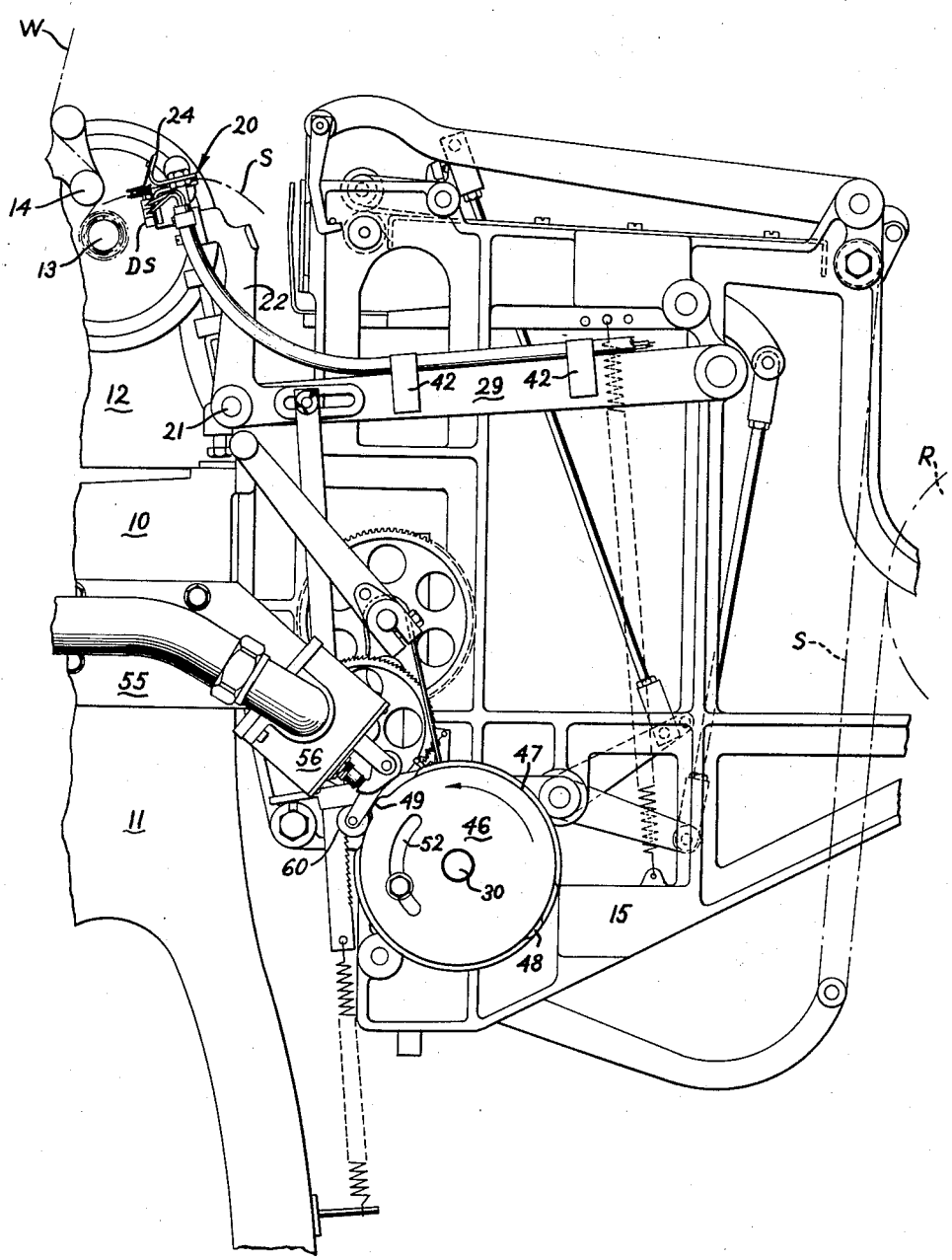
Fig. 1 is a fragmentary end view of a coil winding machine adapted to insert sheets of insulating material between layers of a winding coil showing the paper detecting mechanism of the present invention in place thereon.
Figure 2:
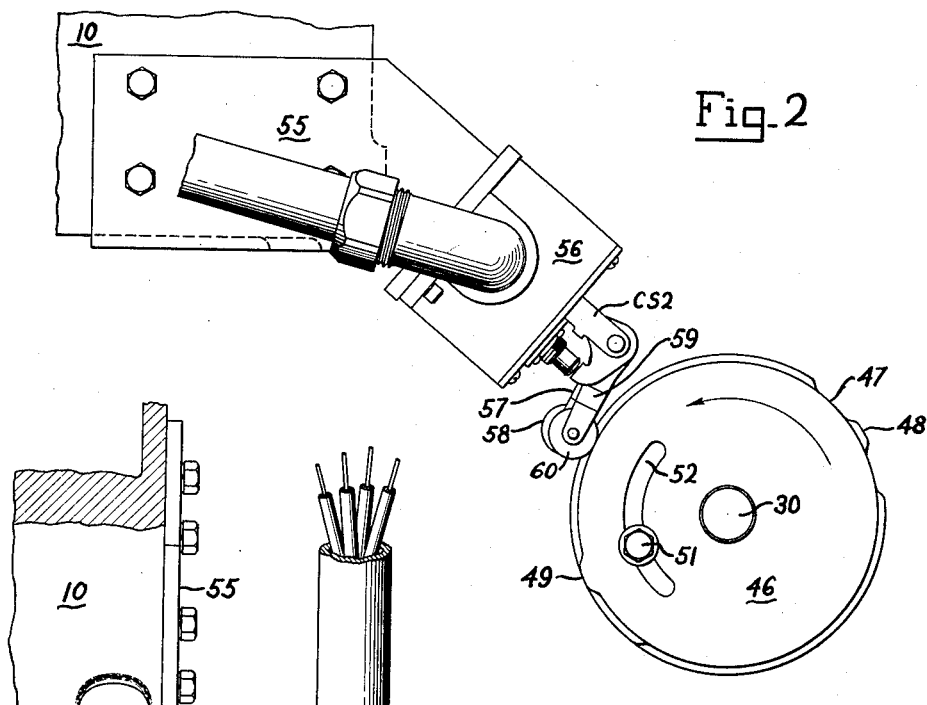
Fig. 2 is an enlarged fragmentary end view showing the cams and switches that activate the paper detecting circuit of the present invention.
Figure 3:
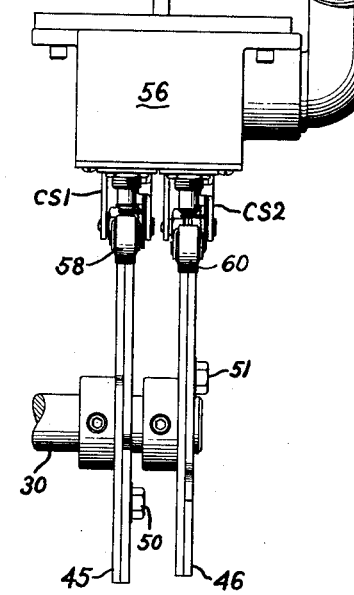
Fig. 3 is a fragmentary front elevation showing the cams and switches of Fig. 2.

The present invention can be applied to any machine for winding electrical coils that automatically places a sheet of insulation material in a holding and delivering device which, at the proper interval in the winding cycle, inserts the insulating material into the winding coil. For convenience, however, the present invention has been shown in connection with the winding machine disclosed in the above mentioned U.S. Patent No. 2,688,450. Inasmuch as the coil winding machine and its mode of operation is fully disclosed in said Patent No. 2,688,450, only so much of it as is necessary to a complete understanding of the present invention will be explained herein.

A bed or table 10 supported by legs 11 carries a headstock 12 having a rotatable spindle (not shown) that rotatably carries a mandrel or arbor 13 on which the electrical coils are wound. A series of wire guides 14 are reciprocated longitudinally of the arbor to traverse a plurality of wires W on the mandrel.

Spaced frame members 15 are secured to bed 10 and carry the insulation measuring, cutting and delivery mechanism. A roll of sheet insulating material R, which may be paper or other suitable material, is mounted on the rear of frame members 15. The sheet of insulating material S is drawn from roll R by suitable levers and rollers, explained in detail in said Patent No. 2,688,450, and is fed in predetermined lengths to insulation delivery shelf 20.

Insulation delivery shelf 20 pivots about the shaft 21, carried by the ends of arms 29, from a rearward position wherein it is opened for the reception of a sheet of insulating material to a forward position wherein it delivers said sheet to a winding coil. As explained in said Patent No. 2,688,450, the insulation delivery shelf comprises a pair of spaced levers 22 connected together by a horizontal cross bar 23. A tension mechanism comprising an upper elongated angular bracket 24 mounting tension rollers 25 is carried by the upper ends of rods 26. A plurality of clamping and tension rollers 27 are carried by the horizontal cross bar 23 for rotation thereon and for clamping thereagainst, all in the manner explained in detail in said Patent No. 2,688,450. A roller shielding and insulation guiding angular member 28 is carried by and spaced from the upper elongated angular bracket 24 to provide an opening between said bracket 24 and said member 28 through which a sheet of insulating material can be fed.

Figure 4:
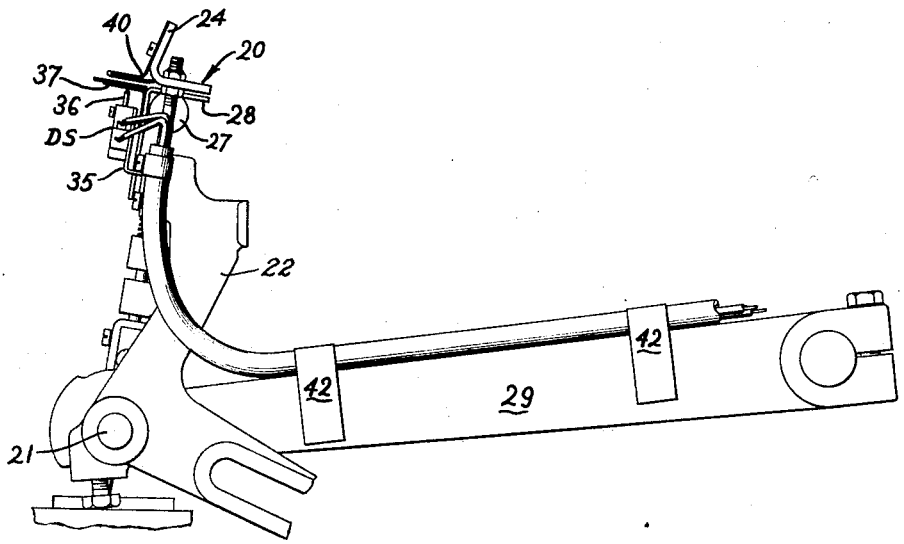
Fig. 4 is an enlarged fragmentary end view showing the insulation delivery shelf of the winding machine with the detector switch in place thereon.
Figure 5:
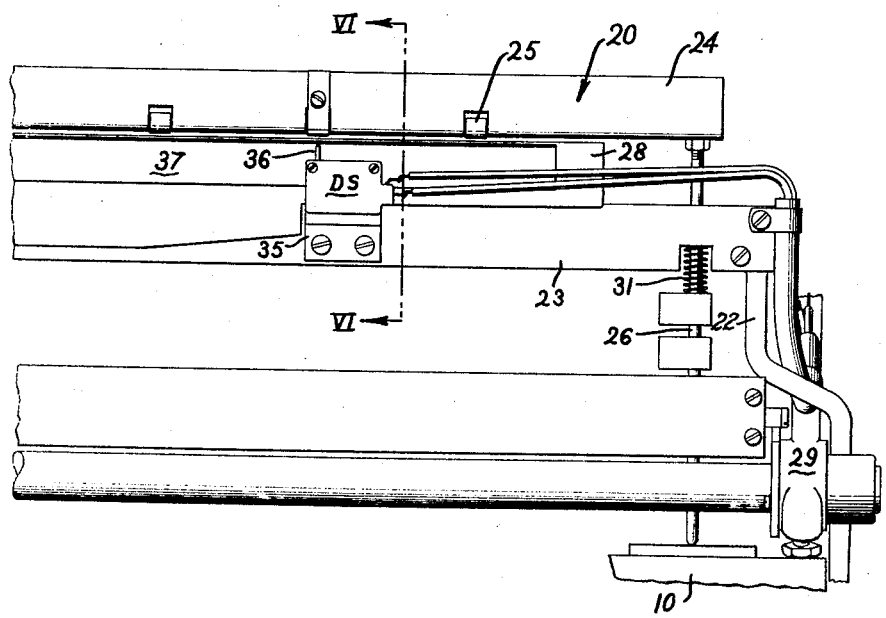
Fig. 5 is a fragmentary front elevation corresponding to Fig. 4.
Figure 6:
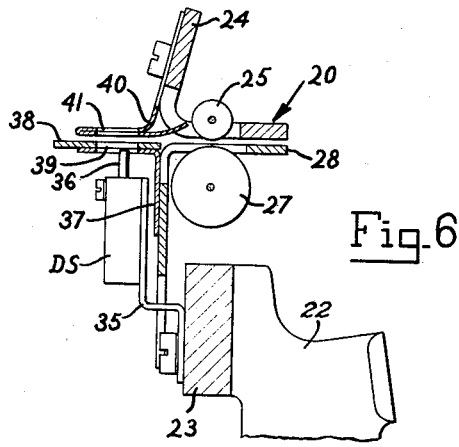
Fig. 6 is a sectional view taken along the line VI—VI of Fig. 5 showing the insulation delivery shelf open to receive a sheet of insulating material.
Figure 7:
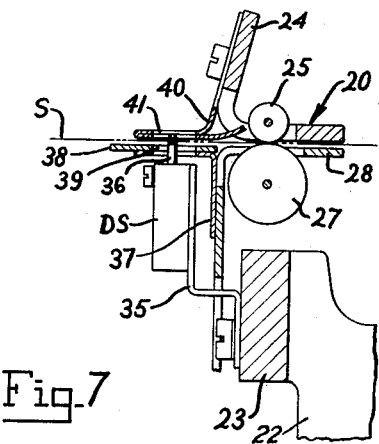
Fig. 7 is a view similar to Fig. 6 but showing a sheet of insulating material in said delivery shelf and said shelf closed to hold said insulation.

When shelf 20 is moved to its rearward position, as illustrated in Fig. 4, arms 29 which carry said shelf are lowered to bring the lower ends of rods 26 into engagement with bed 10 and to move horizontal cross bar 23 and the rollers 27 downwardly away from upper angular bracket 24 and the rollers 25 to permit a sheet of insulation to be inserted between said rollers. The movement of insulation delivery shelf 20, the insertion of a sheet of insulation S in shelf 20 and the measuring and cutting of the sheet of insulation S are actuated in timed sequence with the winding of the coil on mandrel 13 by means of a series of cams and levers operated by shaft 30 which makes one complete revolution for each layer of wire wound on the coil. The mechanism described above is all old and is described in detail in the above mentioned Patent No. 2,688,450.

There are two points in each insulation insertion cycle where the insulation inserting mechanism may fail to function. First when the shelf 20 is in its rearmost position, as disclosed in Fig. 4, the sheet of insulation may not be delivered to said shelf. Second, a sheet of insulation carried by shelf 20 may not be picked up by the winding coil when the shelf is in its forward or insulation delivering position. The present invention is adapted to perform an inspection or detecting operation at these two points in each insulation inserting cycle and stop the winding machine if in the first instance insulation was not delivered to said shelf, and in the second if said insulation was not picked up by the coil. By stopping the winding machine immediately upon the malfunction of the insulation delivering mechanism it is possible to correct the difficulty and thus produce perfectly wound coils. To accomplish this function, a normally open single pole single throw precision snap action switch DS which functions as a paper or insulation detector switch is mounted on horizontal cross bar 23 by means of bracket 35 with its plunger 36 extending upwardly. A paper supporting element comprising an elongated strip 37 having an inverted L-shaped cross section is fixed to the vertical surface of roller shielding member 28, and a flat plate 38 is secured to the upper surface of element 37 to provide an extension on the forward side of paper delivery shelf 20. An opening 39 is provided through the element 37 and plate 38 in alignment with switch plunger 36 to permit said plunger to contact a sheet of insulation in a manner to be explained in detail hereinafter. An L-shaped insulation backing member 40 is secured to the forward face of upper elongated bracket 24 above plunger 36. An opening 41 is provided in member 40 in alignment with the openings 39. Two leads connect detector switch DS to the circuit of the present invention and these leads are secured to one of the arms 29 by means of clips 42.

After a sheet of insulation has been placed in delivery shelf 20 arms 29 lift said shelf to disengage rods 26 from bed 10 to permit the insulation supporting elements 24, 28, 37 and 40 to be drawn toward horizontal bar 23 by springs 31. This movement of the insulation supporting elements toward bar 23 causes plunger 36 of switch DS to pass through the opening 39 and contact the sheet of insulation S. Inasmuch as said insulation is backed up by backing member 40 the relative movement between said insulation and switch DS depresses plunger 36 to close said switch. In the event a sheet of insulation has failed to enter said shelf, plunger 36 will pass up through opening 41 and said switch will remain open. After the sheet of insulation has been drawn into the winding coil the restraint on plunger 36 obviously is removed and said plunger moves upwardly through opening 41 to open switch DS. In the event the coil fails to pick up the insulation said plunger will remain depressed and switch DS will remain closed.

Two cams 45 and 46 are adjustably fixed to the end of shaft 30. Cam 45 is substantially circular throughout the major portion of its periphery and has one low length 47. Cam 46 is substantially circular throughout its periphery but has two short high points 48 and 49 thereon. Both cams 45 and 46 are made in two flat sections that are clamped together by bolts 50 and 51 respectively which are threadedly engaged in one section of the cam and passed through an arcuate slot 52 in the other section of the cam. This sectional arrangement of the cams makes them adjustable so that the low point on cam 55 can be shortened or lengthened, and the arcuate relationship of the two high points on cam 46 with respect to each other can be adjusted. A bracket 55 is fixed to bed 10 and has a switch box 56 mounted thereon adjacent cams 45 and 46. Two switches CS1 and CS2 are mounted in box 56 so as to be actuated by the cams 45 and 46 respectively. The switch actuating arm 57 of switch CS1 carries a roller 58 on the end thereof which is in engagement with the periphery of cam 45. Switch actuating arm 59 of switch CS2 carries a roller 60 on the end thereof which is in engagement with the periphery of cam 46. Switch CS1 is a single pole double throw switch and switch CS2 is a normally closed single pole single throw switch. It will therefore be seen that during each revolution of shaft 30 one side of switch CS1 will be closed for a majority of the revolution and the other side thereof will be closed during the smaller portion of the revolution while the switch roller 58 is engaged in the low point 47 of cam 45. Switch CS2 will remain closed during the major portion of the revolution of cam 46 but will be opened briefly twice when roller 60 is engaged by the high points 48 and 49. The high points 48 and 49 on cam 46 are so adjusted with respect to each other, and said cam is so positioned on shaft 30, that switch CS2 will be opened briefly immediately after a sheet of insulation has been placed in delivery shelf 20 and said shelf lifted by arms 29 to move the insulation supporting elements towards cross bar 23, and will be briefly opened again immediately after said shelf 20 has moved to its forward position to deliver said insulation to the winding coil. Cam 45 is so adjusted and so positioned on shaft 30 that it opens one side of switch CS1 and closes the second side thereof shortly before the insulation is delivered to the winding coil and before switch CS2 is opened and returns said switch to its original position shortly after switch CS2 is again closed.

Figure 8:
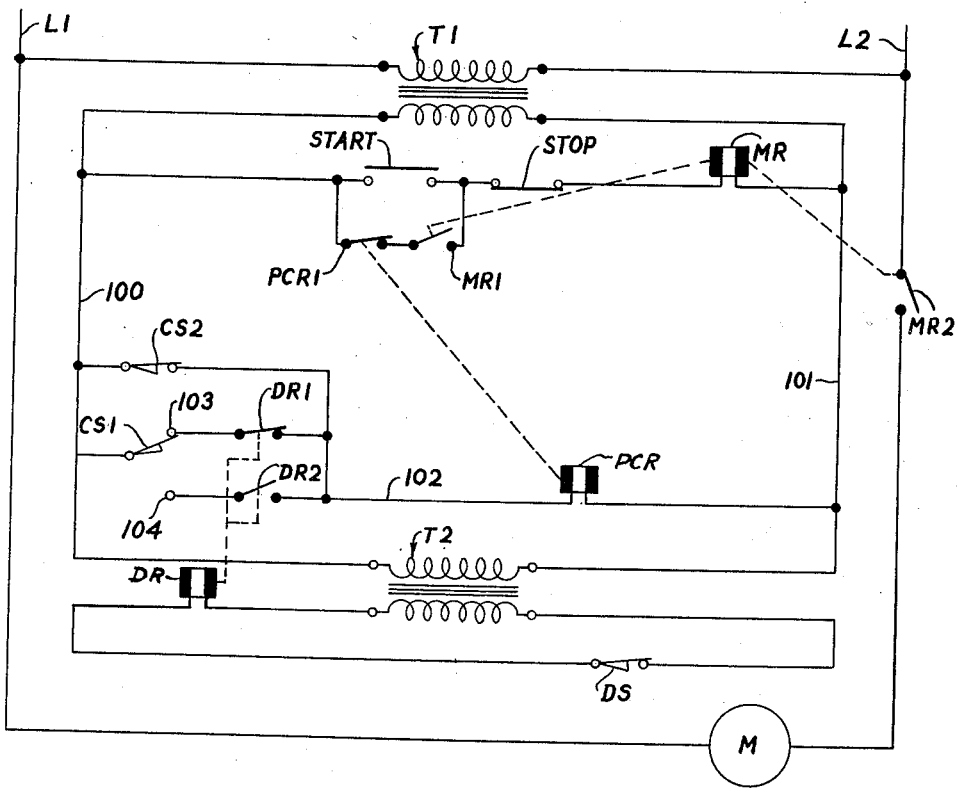
Fig. 8 is a schematic wiring diagram of the circuit.

The circuit employed in the above described apparatus is shown in schematic form in Fig. 8 of the drawing. Electric motor M drives the coil winding mechanism, and the insulation detecting apparatus and circuit of the present invention operates on said motor to stop it and thus stop said winding machine in the event the insulation feeding portion thereof fails to operate properly. The primary winding of transformer T1 and motor M are connected in parallel across electric power lines L1 and L2. The secondary coil of transformer T1 is connected by means of leads 100 and 101 to the primary coil of transformer T2. A normally open Start switch, a normally closed Stop switch and the holding coil of motor relay MR are connected in series across the leads 100 and 101. The normally open contacts PCR1 of paper control relay PCR and the holding contacts MR1 of motor relay MR are connected in series around the Start switch. The main contacts MR2 of motor relay MR are connected in power line L2 ahead of motor M. One side of single pole single throw cam controlled switch CS2 is connected to lead 100. The other side of switch CS2 is connected to one side of paper control relay PCR by means of lead 102 and the other side of relay PCR is connected to lead 101. Single pole double throw cam controlled switch CS1 has its movable contact connected to line 100. Fixed contact 103 of switch CS1 is connected through the normally open contacts DR1 of detector relay DR to the lead 102. The second fixed contact 104 of switch CS1 is connected through the normally closed contacts DR2 of detector relay DR to the lead 102. Detector relay DR and normally open detector switch DS are connected in series to the secondary coil of transformer T2. It should be noted that the switch CS2 remains closed through most of the winding cycle and is opened twice during each paper delivery cycle for a brief interval to enable the detector switch DS and the relay DR controlled thereby to stop the operation of the machine in the event of a malfunction in the mechanism for supplying insulation to shelf 20 and if said shelf fails to deliver the insulation to the winding coil. Switch CS2 is opened for a brief interval immediately after paper delivery shelf 20 closes to grip a sheet of insulation, and again for a brief interval immediately after the paper delivery shelf has delivered the sheet of paper to the winding coil. The movement of switch CS1 from the terminal 103 to terminal 104 takes place during the periods in the cycle when switch CS2 is closed.

The above described apparatus and circuit function in the following manner. The secondary of transformer T1 provides a source of control voltage for operating motor relay MR which when energized and deenergized closes and opens respectively the contacts MR2 to start and stop motor M. The secondary coil of transformer T2 provides a second source of control current which, depending on the presence or absence of a sheet of insulation in shelf 20 at two predetermined instances in the winding cycle, will cause contacts PCR1 to remain closed whereby the winding cycle will continue or will permit said contacts to open to stop said winding cycle. To start the winding machine in operation, the Start switch is closed permitting current to flow through motor relay MR and causing said relay to close the holding contacts MR1 and the main contacts MR2. With the holding contacts MR1 closed current will continue to flow through said relay after the Start switch is released by the operator by passing through the closed contacts PCR1 and the closed holding contacts MR1 until such time as the circuit is broken by opening the Stop switch or contacts PCR1 are opened by the paper detecting part of the circuit to be explained more fully hereinafter.

After a sheet of paper has been placed in paper delivery shelf 20 said shelf is closed, in the manner described above and in Patent No. 2,688,450, to hold said paper therein. This closing of shelf 20 presses the plunger 36 of detector switch DS against the surface of the paper to depress said plunger to close said switch thereby permitting current to flow through relay DR. Energizing relay DR causes it to close contacts DR1 and open contacts DR2. Prior to this point in the cycle, cam 45 has operated switch CS1 to bring its movable contact against the terminal 103. As soon as shelf 20 has closed so that switch DS is closed, if a sheet of paper is in said shelf, cam 46 opens switch CS2. If switch DS is closed by a sheet of insulation, control current will flow through switch CS1, contacts DR1 and relay PCR to keep contacts PCR1 closed and motor relay MR energized so that the apparatus will continue to operate. In the event a sheet of paper was not placed in paper delivery shelf 20 detector switch DS will not be closed, detector relay DR will not be energized, and, therefore, contacts DR1 will be open and the winding machine will stop when switch CS2 is opened by cam 46 because no current will pass through relay PCR whereupon the contacts PCR1 will open to deenergize motor relay MR. The lobe of cam 46 which opens switch CS2 is short so that said switch CS2 remains open only a short interval. After switch CS2 is again closed cam 45 actuates switch CS1 to move its movable contact against the terminal 104. This movement of switch CS1 will not stop motor M because relay PCR will remain energized through switch CS2.

As the winding cycle progresses, paper delivery shelf 20 moves forward and delivers the sheet of insulation carried thereby to the winding coil, all in a manner explained in detail in United States Patent No. 2,688,450. It will be understood that the closing of switch CS2 and the changing of switch CS1 takes place while shelf 20 is moving forward and before the insulation leaves said shelf. When the insulation leaves said shelf, plunger 36 of detector switch DS is released permitting that switch to open and thereby deenergize relay DR. As soon as relay DR is deenergized the contacts DR1 open and the contacts DR2 close. Immediately after the paper is delivered into the coil, cam 46 once again opens switch CS2. If the sheet of insulation has been delivered into the winding coil the winding machine will continue to run because electrical energy will pass through switch CS1 and terminal 104, contacts DR2 and relay PCR to maintain the contacts PCR1 closed. In the event the sheet of paper was not delivered, detector switch DS will remain closed, detector relay DR will remain energized and contacts DR2 will be open thus preventing the passage of current through relay PCR when switch CS2 is opened.

The above described circuit discloses two transformers T1 and T2 to provide two sources of control current of lower voltage than the line current. It is preferred that the voltage provided by transformer T2 across detector switch DS and detector relay DR be lower, for the sake of personnel safety, than the voltage across lines 100 and 101. However, it will be understood that transformer T2 can be eliminated and detector switch DS and detector relay DR connected across lines 100 and 101 thus utilizing the same source of control current as the rest of the circuit. It will also be understood that transformer T1 can be eliminated and the full line current used as the control current for the control circuit.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. An apparatus for delivering sheets of material to a predetermined work area at predetermined intervals comprising the combination of a sheet delivering member adapted to receive a sheet of material and deliver said sheet to said work area, means for placing a sheet of material in said delivering member, an electric motor for driving said apparatus, a normally open pair of contacts for connecting said motor to a source of electric power, a second pair of normally open contacts, a relay for closing said two pairs of contacts when it is energized, a third pair of normally open contacts, means for connecting said relay and said second and third pairs of contacts in series to a source of control current, a second relay for closing said third pair of contacts when it is energized, a switch for connecting said second relay to a source of control current, means for opening said switch after said sheet placing means has operated to place a sheet of material in said delivering member, a second switch cooperating with said delivering member and adapted to be actuated by a sheet of material held by said delivering member, and means connecting said second switch to a source of control current, said second switch when actuated being capable of maintaining said second relay energized when said first mentioned switch is opened whereby said third pair of contacts is maintained closed.

2. An apparatus for delivering sheets of material to a predetermined work area at predetermined intervals comprising the combination of a sheet delivering member adapted to receive a sheet of material and deliver said sheet to said work area, means for placing a sheet of material in said delivering member, an electric motor for driving said apparatus, a normally open pair of contacts for connecting said motor to a source of electric power, a second pair of normally open contacts, a relay for closing said two pairs of contacts when it is energized, a third pair of normally open contacts, means for connecting said relay and second and third pairs of contacts in series to a source of control current, a second relay for closing said third pair of contacts when it is energized, a switch, means for connecting said switch and said second relay in series to a source of control current, means for opening and closing said switch after said sheet placing means has operated to place a sheet of material in said delivering member and after said delivering member has operated to deliver said sheet to a work area, a second switch cooperating with said delivering member and adapted to be closed by a sheet of material held by said delivering member, a third relay, means connecting said third relay and said second switch in series to a source of control current, a fourth pair of normally open contacts and a normally closed pair of contacts actuated by said third relay, and means for selectively connecting said fourth pair of normally open contacts and said pair of normally closed contacts in parallel with said first mentioned switch.

3. An apparatus for delivering sheets of material to a predetermined work area at predetermined intervals comprising the combination of a sheet delivering member adapted to receive a sheet of material and deliver said sheet to a work area, means for placing a sheet of material in said delivering member, an electric motor for driving said apparatus, a normally open pair of contacts for connecting said motor to a source of electric power, a second pair of normally open contacts, a relay for closing said two pairs of contacts when it is energized, a third pair of normally open contacts, means for connecting said relay and second and third pairs of contacts in series to a source of control current, a second relay for closing said third pair of contacts when it is energized, a switch, means for connecting said switch and said second relay in series to a source of control current, a second switch cooperating with said delivering member and adapted to be closed by a sheet of material held by said delivering member, a third relay, means connecting said third relay and said second switch in series to a source of control current, a fourth pair of normally open contacts and a normally closed pair of contacts actuated by said third relay, means for opening and closing said first mentioned switch a first time after said sheet placing means has operated to place a sheet of material in said delivering member, means for connecting said fourth pair of contacts in parallel with said first mentioned switch prior to the time it is opened said first time and disconnecting them after it is closed, means for opening and closing said first mentioned switch a second time after said delivering member has operated to deliver said sheet to a work area, and means for connecting said normally closed pair of contacts in parallel with said first mentioned switch prior to the time it is opened said second time and disconnecting them after it is closed.

4. An apparatus as set forth in claim 3 wherein said means for connecting and disconnecting said fourth pair of normally open contacts and said pair of normally closed contacts is a single pole double throw switch.

5. An apparatus as set forth in claim 4 wherein said means for opening and closing said first mentioned switch and for actuating said single pole double throw switch are cams.

6. An apparatus and activating means therefor for delivering sheets of material to a predetermined work area comprising the combination of a sheet delivering member adapted to receive a sheet of material from a supply thereof during one period in the operating cycle of said apparatus and deliver said sheet to said work area during a second period in said operating cycle, a driving motor, means for starting said motor, a sheet sensing device cooperating with said delivering member and actuated by a sheet of material in said member to provide an electric current indicating the presence of said sheet, operable means for stopping said motor, means for operating said stopping means a first time subsequent to said one period and a second time subsequent to said second period, and means actuated by the presence of said electric current during said first operation of said stopping means and by the absence of said electric current during said second operation of said stopping means for rendering said stopping means inoperative.

7. An apparatus and activating means therefor for delivering sheets of material to a predetermined work area comprising the combination of a sheet delivering member adapted to receive a sheet of material from a supply thereof during one period in the operating cycle of said apparatus and deliver said sheet to said work area during a second period in said operating cycle, an electric motor, means operable to connect said motor to and disconnect it from a source of electric power to respectively start and stop said motor, a switch cooperating with said delivering member and adapted to be closed by a sheet of material in said member, a source of control current, a second switch for operating said means when it is open to disconect said motor from said source of power, means for opening said second switch a first time subsequent to said one period and a second time subsequent to said second period, and means connected in series with said first mentioned switch and said source of control current and actuated by the flow of control current during the first opening of said second switch, when said first mentioned switch is closed, and by the absence of control current during the second opening of said second switch, when said first mentioned switch is open, for rendering the opening of said second switch ineffective to disconnect said motor from said source of power.

References Cited in the file of this patent

UNITED STATES PATENTS

| | | |
|---|---|---|
| 968,063 | La Batt | Aug. 23, 1910 |
| 1,061,169 | Folz et al. | May 6, 1913 |
| 1,377,808 | Cotterman | May 10, 1921 |
| 2,765,733 | Gollwitzer | Oct. 9, 1956 |